United States Patent
Cantrell

(10) Patent No.: US 10,086,543 B2
(45) Date of Patent: Oct. 2, 2018

(54) AUTO CATCH APPARATUS AND METHOD OF USE IN MAKING CHEMICAL MECHANICAL POLISHING PADS

(71) Applicant: Rohm and Haas Electronic Materials CMP Holdings, Inc., Newark, DE (US)

(72) Inventor: Brian T. Cantrell, Port Deposit, MD (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 137 days.

(21) Appl. No.: 15/231,926

(22) Filed: Aug. 9, 2016

(65) Prior Publication Data

US 2018/0043588 A1 Feb. 15, 2018

(51) Int. Cl.
| | |
|---|---|
| *B29C 44/34* | (2006.01) |
| *B29C 44/02* | (2006.01) |
| *B29C 44/40* | (2006.01) |
| *B29C 44/60* | (2006.01) |
| *B29K 75/00* | (2006.01) |
| *B29K 105/04* | (2006.01) |
| *B29L 31/00* | (2006.01) |

(52) U.S. Cl.
CPC ............. *B29C 44/35* (2013.01); *B29C 44/02* (2013.01); *B29C 44/40* (2013.01); *B29C 44/60* (2013.01); *B29K 2075/00* (2013.01); *B29K 2105/04* (2013.01); *B29L 2031/736* (2013.01)

(58) Field of Classification Search
CPC ......... B29C 44/35; B29C 44/60; B29C 44/40; B29C 44/02; B29D 11/00538; B29D 11/00951; B29D 11/00432
See application file for complete search history.

(56) References Cited

U.S. PATENT DOCUMENTS

| | | | |
|---|---|---|---|
| 7,275,928 B2 | 10/2007 | Kolesar et al. | |
| 7,396,497 B2 | 7/2008 | Koetas et al. | |
| 7,947,098 B2 | 5/2011 | Esbenshade et al. | |
| 2005/0087320 A1* | 4/2005 | Kono | B22D 17/007 164/113 |
| 2008/0145544 A1* | 6/2008 | Schamberg | B29C 44/461 427/373 |

FOREIGN PATENT DOCUMENTS

CN 204249185 4/2015

* cited by examiner

*Primary Examiner* — Alison L Hindenlang
*Assistant Examiner* — Mohamed K Ahmed Ali
(74) *Attorney, Agent, or Firm* — Andrew Merriam; Blake T. Biederman

(57) ABSTRACT

The present invention provides an apparatus for use in mixing and dispensing a curable fluid stream (stream) into an open mold to fill the mold to make polishing pads for chemical mechanical planarization of substrates. The apparatus comprises an actuator frame on which is mounted (i) a set of two plates releasably attached to the actuator frame and adapted to cut the stream when the mold is full and to release from the actuator frame after cutting the stream, and (ii) a dispenser unit for continuous pouring of the stream into an open mold, the apparatus adapted to enable removal of the released plates from the actuator during the continuous pouring after the mold is full, e.g. by raising the actuator frame and the (ii) dispenser unit, whereby one can place a container above the mold to catch the plates.

8 Claims, 2 Drawing Sheets

AUTO CATCH APPARATUS AND METHOD OF USE IN MAKING CHEMICAL MECHANICAL POLISHING PADS

The present invention relates to an apparatus for use in mixing and dispensing a curable fluid stream into a mold to make polishing pads for chemical mechanical planarization of substrates, the apparatus comprising an actuator frame on which is mounted (i) a set of plates releasably attached to the actuator frame and adapted to cut the curable fluid stream when the mold is full and to release from the actuator frame after cutting the curable fluid stream, and (ii) a dispenser unit for continuous pouring of the curable fluid stream into an open mold and adapted to enable removal of the released plates from the actuator during the continuous pouring and subsequent pouring into a new mold, as well as methods for using the apparatus.

The manufacture of polishing pads for use in chemical mechanical planarization is known to include the pouring, e.g. by pumping, of a urethane forming mixture into a mold and curing, followed by demolding and cutting the cured polyurethane in a direction parallel to the surface of the mold to form a layer having desired thickness, for example, by skiving, and then by shaping the resulting layer, for example, by grinding, routing or embossing into a polishing pad. Previously, known methods of forming such moldings required the user to manually stop the pouring of the urethane forming mixture after the filling of each mold. This meant that the user to had to insert a small container under the pouring stream of urethane forming mixture quickly while keeping the pour nozzle very close to the mold surface and without making any contact with the material in the mold (the "cake"); then the user had to raise the nozzle and get a larger container, such as a bucket, underneath it to capture the urethane forming mixture as it continued to pour after the filling of the mold until the pouring could be stopped. The manual process caused defects when the operator or the container would make contact with the cake; for example, the action of sliding a small container underneath a stream of fluid material commonly resulted in the deposition of a small amount of material unevenly onto the top of the mold on the opposite side from which the container was inserted by the user, resulting in a "sling defect". Aside from the skill required, the operation had the user positioned right above the cake while the urethane forming mixture was pouring, thereby exposing the user to splash and vapor hazards. In addition, to save on raw material costs, the pumping of the urethane forming mixture had to be stopped after the filling of each mold, resulting in lower yields and raw material waste.

China patent publication no. CN 204249185 U, to Chengzhong, discloses in a utility model a waste collection device for collecting uncured polyurethane foam in a molding process so as to keep such foam from dripping or spilling onto or into an already filled mold. The Chengzhong device includes a circular waste collection plate rotatably mounted on a translating beam that sits just above the mold and follows a mold filling device or dispenser so as to keep the dispenser from dripping foam material into the mold after it is filled. The Chengzhong device has a blade which scrapes collected foam off the plate and into a collection box. Chengzhong fails to disclose continuous molding methods or any solution to enable continuous pouring into successive molds.

The present inventors have endeavored to enable a continuous molding method to make cakes for use in forming chemical mechanical polishing pads without any defects, such as sling defects, being formed.

STATEMENT OF THE INVENTION

1. In accordance with the present invention, an apparatus for use in mixing and dispensing a curable fluid stream preferably, in the form of a foam, into an open mold to fill the mold to make polishing pads for chemical mechanical planarization of substrates, such as semiconductors and lenses comprise an actuator frame on which is mounted (i) a set of plates, preferably, two plates, releasably attached to the actuator frame and adapted to cut the curable fluid stream when the mold is full and to release from the actuator frame after cutting the curable fluid stream, and (ii) a dispenser unit for continuous pouring of the curable fluid stream into an open mold, wherein the apparatus, the (ii) dispenser unit, or the (ii) dispenser unit and the actuator frame are adapted to enable removal of the released plates from the actuator during the continuous pouring after the mold is full and to enable subsequent pouring into a new mold, such as by raising the actuator frame and the (ii) dispenser unit a sufficient distance to enable a user to place a container above the mold to catch the plates, such as by use of one or more actuator units to move the apparatus.

2. In accordance with the apparatus as in item 1 of the present invention, above, wherein the (i) set of plates comprises a catch plate and a sling plate, wherein once the mold is full the catch plate moves directly under, the curable fluid stream within 2.54 cm or, preferably, within 1 cm of the surface of the mold and wherein the sling plate that moves under the part of the catch plate that moves directly under the curable fluid stream from the side of the curable fluid stream opposite the catch plate to catch any of curable fluid stream that is slung or splashed by the catch plate.

3. In accordance with the apparatus as in any of items 1 or 2 of the present invention, above, wherein the actuator frame has mounted on it one or more arms for controlling the movement of the (i) set of plates and to which the set of plates is releasably attached, preferably, a (i) set of two plates and two arms, such as a catch plate releasably attached to a catch arm and a sling plate releasably attached to a sling arm.

4. In accordance with the apparatus as in item 3 of the present invention, above, comprising a (i) set of two plates, a catch plate and a sling plate, each plate releasably attached to an arm that is attached at its opposite end to the actuator unit, respectively, a catch arm and a sling arm, wherein each of the arms moves in an arcuate fashion to open a gap between the two plates to allow flow of the curable fluid stream from the (ii) dispenser unit and to remain open while the mold is filled, and, when the mold is full, to close and to cut the flow of the curable fluid stream into the mold so that a portion of each of the catch plate and of the sling plate overlap each other at the location of the curable fluid stream, preferably, with the overlapping portion of the catch plate fitting slidably into the overlapping portion of the sling plate.

5. In accordance with the apparatus as in any of items 3 or 4 of the present invention, above, wherein each of the catch arm and the sling arm are attached to the actuator frame with the left hand arm attached to the right hand side of the actuator frame and the right hand arm attached to the left hand side of the actuator frame so that the arms themselves do not touch or interfere with one another at any point.

6. In accordance with the apparatus as in any one of items 1, 2, 3, 4 or 5 of the present invention, above, wherein each plate in the (i) set of plates is released from the actuator frame by a roller actuator comprising a spring loaded roller or clip and a plate housing into which at least part of each plate slides, whereby the roller or clip holds the plate in position between the roller or clip and the plate housing and whereby the roller actuator releases each plate by lifting the roller or clip away from the plate housing and enabling the plate to fall away from the apparatus.

7. In accordance with the apparatus as in item 6 of the present invention, above, wherein a roller actuator is located at the end of each arm and each roller actuator releases each plate from the end of each arm.

8. In accordance with the apparatus as in any one of items 1, 2, 3, 4, 5, 6 or 7 of the present invention, above, wherein each plate in the (i) set of plates is made of a disposable or recyclable material, such as paper, bamboo, polyester, such as polyethylene terephthalate (PET) or a polyolefin, such as low density polyethylene (LDPE).

9. In accordance with the apparatus as in any one of items 1, 2, 3, 4, 5, 6, 7 or 8, above, wherein the apparatus further comprise one or more actuator units, preferably, two actuator units adapted to move (ii) dispenser unit or both the dispenser unit and the actuator frame, up and away from the mold surface to enable a user or a robot to place a container under the curable fluid stream to catch the (i) set of plates when they are released and to catch the curable fluid stream while a new mold is placed under the (ii) dispenser unit and a new (i) set of plates is attached to the actuator frame, the one or more actuators further adapted to lower the (ii) dispenser unit and the actuator frame into position to pour the curable fluid stream into the new mold.

10. In accordance with the apparatus of the present invention as in item 9, above, wherein each of the one or more actuator units is chosen from a programmable electronic actuator having mechanical linkage enabling the programmed movement, such as a robot, preferably, a robot having a six axis arm capable of XYZ axial movement and rotational movement, a gear driven actuator, such as an automated Z axis ball screw, and a pneumatic actuator, such as a pneumatic lifter or cylinder, preferably, one or two electronically programmed robots.

11. In accordance with another aspect of the present invention, methods for using the apparatus of the present invention as in any one of items 1 to 10, above, comprise continuously mixing and pouring a curable fluid stream from the (ii) dispenser unit into a mold to form a cake and cutting the curable fluid stream cleanly using the (i) set of plates and close to the top surface of the cake to avoid defects or outright loss of the entire cake.

12. In accordance with the methods of the present invention as in item 11, above, the methods further comprising catching the (i) set of plates when they are released from the actuator frame, preferably, from an arm to which each plate is releasably attached, and catching the pouring curable fluid stream when it is cut, the catching comprising raising the (ii) dispenser unit or the actuator frame and the (ii) dispenser unit a sufficient distance to enable a user to place a container above the mold to catch the plates without touching the surface of the mold and placing under the set of plates and under the curable fluid stream a container large enough to hold the set of plates and the amount of the curable fluid stream flowing from the (ii) dispenser unit after cutting the curable fluid stream and before a new mold is placed under the (ii) dispenser unit.

13. In accordance with the methods of the present invention as in item 11, above, the methods further comprising placing a new mold under the (ii) dispenser unit and releasably attaching a new (i) set of plates on the actuator frame, preferably, each to the end of an arm attached to the actuator unit.

14. In accordance with the methods of the present invention as in 13, above, wherein continuously pouring is automated synchronously with an automated conveyor for the molds to place a new mold under the (ii) dispenser unit after the mold is full and a new (i) set of plates has been attached to the actuator unit.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "actuator" refers to a device that electronically, pneumatically, such as through a mechanical linkage to a cylinder, and/or mechanically controls the movement of another thing to which it is connected.

As used herein, the term "ASTM" refers to publications of ASTM International, West Conshohocken, Pa.

As used herein, the term "polyisocyanate" means any isocyanate group containing molecule having three or more isocyanate groups, including blocked isocyanate groups.

As used herein, the term "polyisocyanate prepolymer" means any isocyanate group containing molecule that is the reaction product of an excess of a diisocyanate or polyisocyanate with an active hydrogen containing compound containing two or more active hydrogen groups, such as diamines, diols, triols, and polyols.

As used herein, the term "sufficient distance" refers to a distance greater, preferably, at least 2 cm greater, or, more preferably, at least 4 cm greater than the height of a container that is placed between, on the one hand, the (ii) dispenser unit and the actuator frame and, on the other hand, the top surface of a mold to catch the (i) set of plates and a continuously pouring curable fluid stream.

As used herein, unless otherwise indicated, the term "wt. % NCO" refers to the amount as reported on a spec sheet or MSDS for a given NCO group or blocked NCO group containing product.

As used herein, the term "wt. %" stands for weight percent.

The present inventors have discovered an apparatus that enables continuous dispensing of a curable fluid stream to make polishing pads during and between filling of separate molds used to make chemical mechanical polishing pads. The set of plates in the apparatus of the present invention will hold the curable fluid stream for long enough for a container or collector, for example, a bucket, to be put under the flow of the curable fluid stream so that the set of plates that was holding the material will drop into the container. The apparatus of the present invention helps eliminate mold defects, including sling defects while allowing the user to continue pouring curable fluid stream to fill other molds. Whereas to stop the flow by stopping the pump, it takes several seconds and up to a minute to re-stabilize the flow resulting wasted raw materials. By enabling continuous delivery of the curable fluid stream, the present inventors have found that they can save raw material costs by not having to purge the mixing and molding apparatus after each mold is filled, i.e. each cake is poured.

The apparatus of the present invention works best with two plates by moving then in an arcuate fashion to bring them together at their front edge within 2.54 cm or, preferably, within 1 cm of the surface of the mold (cake) and cutting off or slicing through the curable fluid stream to cleanly stop the flow thereof to the mold. The apparatus then raises up and releases the plates into a container, for example, a bucket or container is kept in place while the curable fluid stream continuously flows until the next mold arrives and the bucket is removed, followed by pouring the next mold or cake. Without the set of (two) plates, one would have to position a container bucket under the curable fluid stream until the next open mold was placed under the stream. The container may damage the cake.

The (i) set of plates is disposable or reusable.

The apparatus is adapted to allow pouring of the curable fluid stream into a new mold by including in the apparatus a plate hold/release housing that allows each of the plates in the (i) set of plates to clip or snap into place on the housing. In use, one can raise the apparatus away from a filled mold, and the apparatus releases the (i) set of plates from the actuator unit. Once the old plates are released, new plates can be clipped into place and the apparatus positioned with the (ii) dispenser unit just above the surface of a new mold and the plates positioned to allow the (ii) dispenser unit to fill the new mold.

Figure 1:
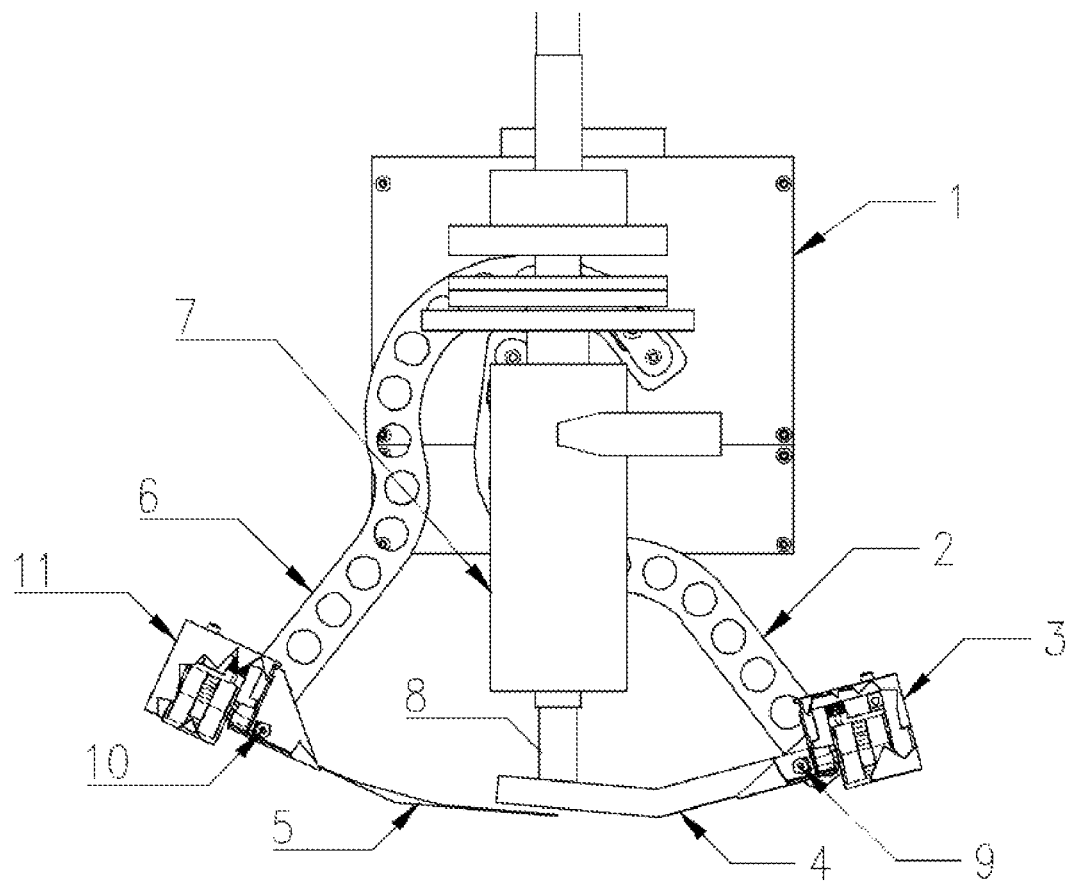
FIG. 1 depicts one embodiment of an apparatus in accordance with the present invention showing, among other things, the actuator frame for the set of plates.

As shown in FIG. 1, an actuator frame 1 connects to and controls two arms, catch arm 2 and sling arm 6. Catch arm 2 connects at its distal end from the connection to actuator frame 1 to a plate hold/release housing 3 to which catch plate 4 releasably attaches. Sling arm 6 connects at its distal end from the connection to actuator frame 1 to a plate hold/release housing 11 to which sling plate 5 releasably attaches. The actuator frame 1 is shown in a closed position in which the catch plate 4 and sling plate 5 would cut the curable fluid stream 8 coming from nozzle 7, a dispenser unit. In use, the actuator frame 1 holds catch arm 2 and sling arm 6 so that a gap exists between catch plate 4 and sling plate 5 to enable the curable fluid stream 8 to flow unobstructed from nozzle 7 into a mold (not shown), below. When the mold is full, each of sling arm 6 and catch arm 2 of actuator frame 1 move to close any gap between them, ending with catch plate 4 on top to catch the bulk of curable fluid stream 8 while sling plate 5 ends up on the bottom and prevents any slinging or splashing of the curable fluid stream 8 onto the contents of the mold, below (not shown). More specifically, sling arm 6 moves counterclockwise in an arcuate fashion and catch arm 2 moves clockwise in an arcuate fashion to close the gap between catch plate 4 and sling plate 5.

The positioning of the arms in the actuator frame of the present invention with the left hand arm attached to the right had side of the actuator frame and the right hand arm attached to the left hand side of the actuator frame so that the arms do not touch one another. This positioning enables the correct swing angle so that the arms close the set of plates so they overlap each other at the location of the curable fluid stream, with minimal or no space in between them. For example, as shown in FIG. 1, the arms (catch arm 2 and sling arm 6) are mounted to opposite sides of the actuator frame 1 using the axis of flow of the curable fluid stream 8 as a vertical center line (not shown); when catch arm 2 and sling arm 6 are in a closed position, the catch plate 4 and sling plate 5 overlap with no space between their overlapping ends.

As shown in FIG. 1, the plate hold/release housing 3 comprises a spring loaded roller mounted on a roller actuator 9. In use, roller actuator 9 holds the catch plate 4 in position between the roller and the plate housing 3; the roller actuator releases catch plate 4 by retracting the roller away from the plate and enabling catch plate 4 to fall away from the apparatus. Another of the same plate hold/release housing 11 mechanism on sling arm 6 comprises a roller actuator 10 that holds the sling plate 5 in position between the roller and the plate housing 11; the roller actuator releases sling plate 5 by retracting the roller away from the plate. In use of the apparatus, the actuator frame 1 or a robot holding the actuator frame 1 is lifted from the mold surface while another actuator or robot (not shown) lifts nozzle 7 up from the mold surface to enable a user or yet another actuator (not shown) to place a suitable container (not shown) under both of catch plate 4 and sling plate 5 which, thereby allowing the catch plate 4 and the sling plate 5 to be removed from the apparatus. In use, both of the catch plate 4 and sling plate 5 are released simultaneously into one single container.

Figure 2:
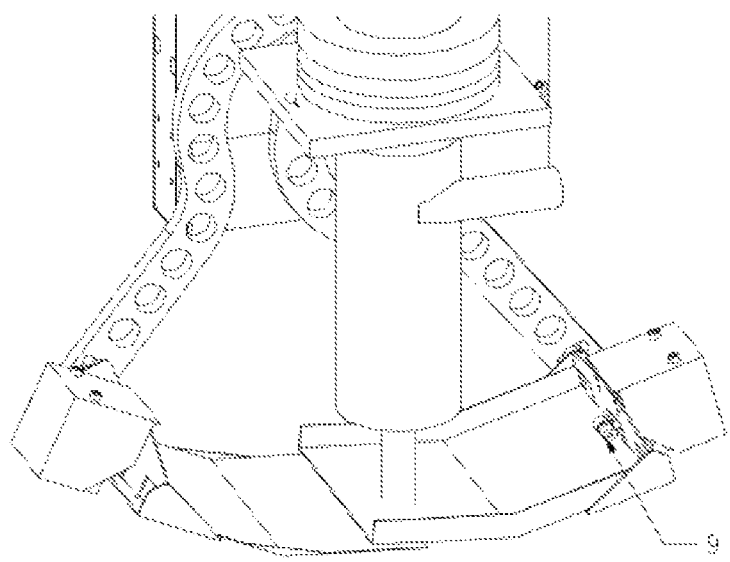
FIG. 2 depicts two arms of the apparatus of the present invention as shown in FIG. 1, showing a perspective view of a set of two plates and an arm for each plate having releasably attached to it a plate for cutting the curable fluid stream.

As shown in FIG. 2, plate hold/release housing 3 (FIG. 1) on the catch plate 4 (FIG. 1) comprises roller actuator 9. The plate hold/release housing 11 (FIG. 1) on the sling plate 5 (FIG. 1) comprises roller actuator 10 (FIG. 1). In the mechanism shown in FIG. 2, rollers pinch the plates with a spring loaded air cylinder. The cylinder moves the rollers in and out allowing the plates to release while the spring pushes down pinching the plates and holding them in place.

Each of the arms attached to the actuator frame, preferably the catch arm and the sling arm, can be mounted on studs or axes having one gear or eccentric mounted them which connect to a gear or, in the case of an eccentric, a roller. On the actuator frame whereby as one faces the unit the sling arm moves clockwise to open and counterclockwise to close and the catch arm moves counterclockwise to open and clockwise to close.

Preferably, the arms that are attached to the actuator frame can be moved by electric driven rotary actuators or and/or robotic actuation, such as, for example, a six axis electronically controlled robot in which the sixth axis drives a set of gears to supply a more controlled and programmable acceleration and deceleration movement.

As used herein, the term "axis" refers to a faceplate in a robot with attachment mounts thereon which can rotate axially. For example, a six axis robot has six such faceplates Each plate in the set of plates is shaped to fit slidably at one end (away from the curable fluid stream) into a plate housing. The plate housing comprises a flange against which the roller actuator can press to form a clip or holder for the plate; the flange need only be large enough to fit one end of the plate inside it.

Each plate in the set of plates is disposable or recyclable and may be made of paper, bamboo, wood, wood composite or recyclable plastic, such as low density polyethylene (LDPE) or polyethylene terephthalate (PET).

The containers for catching the set of plates can be any which are large enough to hold all of the plates and that amount of the curable fluid stream which pours from the time the stream is cut until a new mold is below the (ii) dispenser unit and a new set of plates are attached to the actuator frame or arms thereof.

The actuator units that move the apparatus of the present invention, including the one or more actuator units for the (ii) dispenser unit and the actuator frame can be chosen from a programmable electronic actuator having mechanical linkage enabling the programmed movement, such as a robot, preferably, a robot having a six axis arm capable of XYZ axial movement and rotational movement, a gear driven actuator and a pneumatic actuator, such as a pneumatic cylinder, preferably, electronically programmed robots.

Preferably, the actuator units that lift and lower the dispenser unit and the actuation unit which moves the set of plates comprise robots. For example, one robot lifts and lowers the dispenser unit, while another robot lifts and lowers the actuation unit.

More preferably, a third robot moves a container under the set of plates once the dispenser unit and the actuator frame have been raised away from the mold surface so as to permit insertion of the container under the set of plates.

To save space, the one or more actuator units of the present invention as well as the roller actuator preferably comprise an electronically programmable actuator.

The roller actuator of the present invention holds each plate of the (i) set of plates in place and moves a roller or clip that holds each plate of the (i) set of plates in place to release the plate.

The apparatus of the present invention is used in connection with equipment for the storage, the mixing or forming of and the dispensing of the various parts of a curable fluid stream to make polishing pads; and the apparatus is specifically linked to and positioned at the outlet of the dispensing equipment, for example, a (i) dispenser unit.

Suitable mixing apparatus for forming the curable fluid stream for use in the present invention may comprise a storage tank for each of the one or more parts of the curable fluid stream, a mixing tank and a dispensing device, such as a valved input for the fluid mixture including an opening, for example, a nozzle or an outlet for dispensing the curable fluid stream into an open mold. Suitable apparatus for forming the curable fluid stream may be found, for example, in U.S. Pat. No. 7,275,928 B2, to Kolesar et al.

The mixing apparatus can include one or more gas inlets, preferably, air or oxygen, coupled to any upstream storage tank or mixing tank. All gas inlets can be coupled back to a single source of gas. The mixing tank may be, for example, a premix prep tank for receiving, separately, the one or more parts of the fluid material from the storage tanks in desired or set proportions as a fluid pre-mixture and for forming a curable fluid stream having a desired bulk density.

Preferably, the storage tanks include separate tanks for a fluid polymer or resin, such as a polyisocyanate, and a fluid curing agent, such as an aromatic diamine or triamine.

More preferably, the storage tanks include separate tanks for a fluid polymer or resin, for microspheres or pore forming ingredients, and for a fluid curing agent.

Preferably, the microspheres or pore forming ingredients are stored in a fluidizing hopper that comprises a porous membrane provided over a plenum connected to a fluidizing gas source, such as air or oxygen, via a gas inlet line, wherein the microspheres or pore forming ingredients are fluidized and their bulk density reduced thereby.

An example of a suitable fluidizing hopper may be found, for example, in U.S. Pat. No. 7,396,497 B2 to Koetas et al.

When used for forming curable fluid streams from multiple materials which do not react on mixing, such as polyurethanes and fillers, e.g. polyisocyanate prepolymers and microspheres, such materials may be mixed to form a fluid pre-mixture having a desired bulk density. In such a case, the mixing apparatus of the present invention may further comprise a tank for the fluid pre-mixture and a recirculation loop for recirculating the fluid pre-mixture in the premix prep tank and for mixing until the fluid pre-mixture until it is homogeneously mixed has the desired and bulk density for molding, such as from 0.5 to 1.2 g/cm$^3$.

Preferably, the mixing apparatus comprises a fluid polymer or resin tank, a tank for microspheres or pore forming ingredients, and a tank for one or more curing agents, as well as a premix prep tank including the recirculation loop for mixing the fluid polymer or resin and microspheres or pore forming ingredients to form a polymer pre-mixture, and, downstream therefrom, the mixing tank, which is a premix run tank for mixing the one or more curing agents with the polymer pre-mixture to form the curable fluid stream. The premix run tank is located just upstream of the opening for dispensing the curable fluid stream into an open mold.

Preferably, to minimize entrained gas in the curable fluid stream and any including defects in molded products resulting therefrom, the mixing apparatus comprises downstream of the mixing tank a mix head assembly adapted to receive the contents of the mixing tank and dispense the resulting curable fluid stream into a mold.

An example of a suitable mix head assembly can be found, for example, in U.S. Pat. No. 7,947,098 B2, to Esbenshade et al.

The apparatus of the present invention comprise the dispenser unit and the actuator frame The apparatus of the present invention handle a curable fluid stream used to mold a chemical mechanical polishing pad. An example of a curable fluid stream in accordance with the present invention may be a urethane part containing a microsphere part, or a urethane part containing a curing agent part and a polymeric microsphere part. Where the urethane part contains a curing agent part, the combination of the two parts are used right away and those two parts combined just before filling a mold and curing.

The urethane part may comprise one or more isocyanate-terminated urethane prepolymer which is the reaction product of one or more prepolymer polyol having a number of moles hydroxyl groups with a diisocyanate in an excess number of moles of isocyanate group containing reactants; wherein the isocyanate-terminated urethane prepolymer has 2 to 12 wt % unreacted isocyanate (NCO) groups.

Suitable isocyanate compounds are aliphatic, aromatic and alicyclic diisocyanates, such as those chosen from 2,4-toluene diisocyanate; 2,6-toluene diisocyanate; 4,4'-diphenylmethane diisocyanate; naphthalene-1,5-diisocyanate; toluidine diisocyanate; para-phenylene diisocyanate; xylylene diisocyanate;

isophorone diisocyanate; hexamethylene diisocyanate; 4,4'-dicyclohexylmethane diisocyanate; cyclohexanediisocyanate; and, mixtures thereof.

A suitable prepolymer polyol is selected from the group consisting of diols, polyols, polyol diols, copolymers thereof and mixtures thereof.

Preferably, the prepolymer polyol is chosen from polyether polyols (e.g., poly(oxytetramethylene)glycol, poly(oxypropylene)glycol and mixtures thereof); polycarbonate polyols; polyester polyols; polycaprolactone polyols; mixtures thereof; and, mixtures thereof with one or more low molecular weight polyols selected from the group consisting of ethylene glycol; 1,2-propylene glycol; 1,3-propylene glycol; 1,2-butanediol; 1,3-butanediol; 2-methyl-1,3-propanediol; 1,4-butanediol; neopentyl glycol; 1,5-pentanediol; 3-methyl-1,5-pentanediol; 1,6-hexanediol; diethylene glycol; dipropylene glycol; and, tripropylene glycol.

More preferably, the prepolymer polyol is selected from the group consisting of polytetramethylene ether glycol (PTMEG); ester group containing polyols (such as ethylene adipates, butylene adipates); polypropylene ether glycols (PPG); polycaprolactone polyols; copolymers thereof; and, mixtures thereof. Most preferably, the prepolymer polyol is chosen from PTMEG and PPG.

Preferably, the isocyanate-terminated urethane prepolymer of the present invention is a linear polyisocyante prepolymer containing two isocyanate groups.

Preferably, the isocyanate-terminated urethane prepolymer used in the method of the present invention has 2 to 10 wt % (still more preferably 4 to 8 wt %; most preferably 5 to 7 wt %) unreacted isocyanate (NCO) groups.

The curing agent part may comprise an aromatic diamine or other multifunctional amines, such as aromatic diamines, for example, 4,4'-methylene-bis-o-chloroaniline ("MbOCA"); 4,4'-methylene-bis-(3-chloro-2,6-diethylaniline) ("MCDEA"); dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4-toluendiamine; 3-tert-butyl-2,6-toluenediamine; 5-tert-amyl-2,4-toluenediamine; and 3-tert-amyl-2,6-toluenediamine and chlorotoluenediamine.

The microsphere part may comprise polymeric microspheres or pore forming ingredients such as, for example, entrapped gas bubbles, hollow core polymeric materials, such as polymeric microspheres, liquid filled hollow core polymeric materials, such as fluid filled polymeric microspheres, water soluble materials and an insoluble phase material (e.g., mineral oil). Preferably, the microspheres comprise hollow core polymeric materials uniformly distributed throughout the curable fluid stream.

Preferably, the microspheres have a weight average diameter of less than 150 μm (more preferably of less than 100 μm; most preferably of 5 to 50 μm).

Preferably, the plurality of microelements comprise polymeric microspheres with shell walls of either polyacrylonitrile or a polyacrylonitrile copolymer (e.g., Expancel™ beads from Akzo Nobel, Amsterdam, Netherlands).

In accordance with the present invention, the microspheres are incorporated into the curable fluid stream at 0 to 50 vol. % porosity, or, preferably, 5 to 35 vol. % porosity.

The product chemical mechanical polishing pad of the present invention exhibits a density of ≥0.6 g/cm$^3$ as measured according to ASTM D1622-08 (2008). Thus, the product chemical mechanical polishing pad of the present invention exhibits a density of 0.6 to 1.2 g/cm$^3$, or, preferably, 0.7 to 1.1 g/cm$^3$, or, more preferably, 0.75 to 1.0 g/cm$^3$) as measured according to ASTM D1622-08 (2008).

The chemical mechanical polishing pad of the present invention may be stacked onto a subbing layer, such as a polymer or resin treated non-woven.

To enable the continuous pouring of a curable fluid stream in accordance with the present invention, methods of using the apparatus of the present invention comprise continuously mixing and pouring a curable fluid stream from a (i) dispenser unit into a mold to form a cake and cutting the curable fluid stream cleanly and close to, such as within 2.54 cm of, or, preferably, 1 cm or less of the top surface of the cake to avoid defects or outright loss of the entire cake.

In the methods of the present invention this continuous pouring process may be automated along with an automated conveyor for the molds so that.

EXAMPLES

Molding trials were conducted with a continuous process of the present invention using a microsphere polymer filled one component polyurethane mixed and poured into a round cake shaped mold via a vertically disposed dispenser unit. Each of Example 1 (Inventive) and Comparative Example 2 were continued for a total of 5 molds (cakes).

In Example 1, the apparatus of the present invention as shown in FIG. 1 was used, with a live person inserting a 3.785 L bucket under the dispenser unit to catch the set of two plates, a catch plate and a sling plate, and the microsphere polymer filled polyurethane poured after each mold is full and before pouring into next mold can begin. Also, in Example 1, the apparatus was affixed to an automated Z axis ball screw raising and lowering the dispenser unit and the actuator unit in an out of the molds.

In Comparative Example 2, the dispenser unit and the actuator unit was moved by a robot with all axes in a fixed position to enable drainage into a 3.785 L bucket after each cake for any overflow. Before moving to this bucket the flow microsphere polymer filled polyurethane had to be stopped.

The 5 molds in Example 1 were filled in 14% less time than it took to fill the molds in Comparative Example 2. Further, in the course of making the 5 molds, the amount of the microsphere polymer filled polyurethane wasted between the pouring of the molds in Example 1 was 50% less than the amount wasted in Comparative Example 2. In Example 1, the molds produced had no sling defects even though the dispensing and molding process was continuous.

I claim:

1. An apparatus for use in mixing and dispensing a curable fluid stream into an open mold to fill the mold to make polishing pads for chemical mechanical planarization of substrates comprising an actuator frame on which is mounted (i) a set of two plates releasably attached to the actuator frame and adapted to cut the curable fluid stream when the mold is full and to release from the actuator frame after cutting the curable fluid stream, wherein the actuator frame has mounted on it a set of two arms for controlling the movement of the (i) set of two plates, the plates being a catch plate releasably attached to a catch arm and a sling plate releasably attached to a sling arm and (ii) a dispenser unit for continuous pouring of the curable fluid stream into an open mold, the apparatus is adapted to enable removal of the released plates from the actuator during the continuous pouring and after the mold is full.

2. The apparatus as claimed in claim 1, wherein the (i) set of plates comprises a catch plate and a sling plate, wherein once the mold is full the catch plate moves directly under, the curable fluid stream within 2.54 cm of the surface of the mold and wherein the sling plate that moves under the part of the catch plate that moves directly under the curable fluid stream from the side of the curable fluid stream opposite the catch plate to catch any of curable fluid stream that is slung or splashed by the catch plate.

3. The apparatus as claimed in claim 1 comprising the (i) set of two plates, the catch plate and the sling plate, each plate releasably attached to an arm that is attached at its opposite end to the actuator unit, wherein each of the arms moves in an arcuate fashion to open a gap between the two plates to allow flow of the curable fluid stream from the (ii) dispenser unit and to remain open while the mold is filled, and, when the mold is full, to close and to cut the flow of the curable fluid stream into the mold so that a portion of each of the catch plate and of the sling plate overlap each other at the location of the curable fluid stream.

4. The apparatus as claimed in claim 1, wherein each of the catch arm and the sling arm are attached to the actuator frame with the left hand arm attached to the right hand side of the actuator frame and the right hand arm attached to the left hand side of the actuator frame so that the arms themselves do not touch or interfere with one another at any point.

5. The apparatus as claimed in claim 1, wherein each plate in the (i) set of plates is released from the actuator frame by a roller actuator comprising a spring loaded roller or clip and a plate housing into which at least part of each plate slides, whereby the roller or clip holds the plate in position between the roller or clip and the plate housing and whereby the roller actuator releases each plate by lifting the roller or clip away from the plate housing and enabling the plate to fall away from the apparatus.

6. The apparatus as claimed in claim 1, further comprising one or more actuator units adapted to move (ii) dispenser unit or both the dispenser unit and the actuator frame up and away from the mold surface to enable a user or a robot to place a container under the curable fluid stream to catch the (i) set of plates when they are released and to catch the curable fluid stream while a new mold is placed under the (ii) dispenser unit and a new (i) set of plates is attached to the actuator frame, the one or more actuators further adapted to lower the (ii) dispenser unit and the actuator frame into position to pour the curable fluid stream into the new mold.

7. The apparatus as claimed in claim 6, wherein each of the one or more actuator units is chosen from a programmable electronic actuator having mechanical linkage enabling the programmed movement, a gear driven actuator, and a pneumatic actuator.

8. The apparatus as claimed in claim 7, wherein each of the one or more actuator units is a programmable electronic robot having mechanical linkage enabling the programmed movement.

* * * * *